(12) United States Patent
Charpentier

(10) Patent No.: US 7,458,606 B2
(45) Date of Patent: Dec. 2, 2008

(54) AIR-BAG

(75) Inventor: Frederic Charpentier, Le Vauroux (FR)

(73) Assignee: Autoliv Development AB, Vargarda (SE)

( * ) Notice: Subject to any disclaimer, the term of this patent is extended or adjusted under 35 U.S.C. 154(b) by 258 days.

(21) Appl. No.: 10/499,372

(22) PCT Filed: Nov. 22, 2002

(86) PCT No.: PCT/SE02/02128

§ 371 (c)(1), (2), (4) Date: Jun. 15, 2004

(87) PCT Pub. No.: WO03/051679

PCT Pub. Date: Jun. 26, 2003

(65) Prior Publication Data

US 2005/0006881 A1    Jan. 13, 2005

(30) Foreign Application Priority Data

Dec. 18, 2001 (GB) ................................. 0130225.6
Jun. 25, 2002 (GB) ................................. 0214686.8

(51) Int. Cl.
B60R 21/16 (2006.01)

(52) U.S. Cl. .................. 280/730.2; 280/729; 442/203

(58) Field of Classification Search ............. 280/730.2, 280/740, 729, 743.1, 730.1, 742, 749; 442/203, 442/204
See application file for complete search history.

(56) References Cited

U.S. PATENT DOCUMENTS

| | | | |
|---|---|---|---|
| 1,615,517 A * | 1/1927 | Mundorf ..................... 442/203 |
| 4,238,530 A * | 12/1980 | Hollaway et al. ........... 427/173 |
| 4,325,999 A * | 4/1982 | Campman et al. .......... 428/112 |
| 5,378,019 A * | 1/1995 | Smith et al. ............... 280/743.1 |
| 5,470,106 A * | 11/1995 | Nishimura et al. ........ 280/743.1 |
| 5,713,598 A * | 2/1998 | Morita et al. ............. 280/743.1 |
| 5,884,574 A | 3/1999 | Sogi et al. |
| 6,073,961 A | 6/2000 | Bailey et al. |
| 6,199,898 B1 | 3/2001 | Masuda et al. |
| 6,273,456 B1 | 8/2001 | Heigl |
| 6,283,507 B1 * | 9/2001 | Kami et al. ............... 280/743.1 |
| 6,328,334 B1 | 12/2001 | Kanuma |
| 6,334,625 B1 * | 1/2002 | Pausch et al. ................ 280/729 |
| 6,382,662 B1 | 5/2002 | Igawa |
| 6,530,595 B2 * | 3/2003 | Masuda et al. ............ 280/730.2 |
| 6,554,314 B1 * | 4/2003 | Uchiyama et al. ......... 280/730.2 |
| 6,715,791 B2 | 4/2004 | Keshavaraj |

(Continued)

FOREIGN PATENT DOCUMENTS

DE    199 39 618    5/2000

(Continued)

*Primary Examiner*—Paul N. Dickson
*Assistant Examiner*—Drew J. Brown
(74) *Attorney, Agent, or Firm*—Brinks Hofer Gilson & Lione

(57) ABSTRACT

An air-bag is formed from two super-imposed layers of fabric which define between them at least one inflatable region. A gas supply duct extends into the air-bag. Apertures are formed in the gas supply duct. The gas supply duct is of elongate form, and is formed from a fabric having intersecting warp and weft yarns, the warp and weft yarns being inclined at an angle of between 30° and 60° and preferably 45° to the axis of the gas supply duct.

7 Claims, 4 Drawing Sheets

U.S. PATENT DOCUMENTS

| | | |
|---|---|---|
| 6,755,436 B2 | 6/2004 | Hess et al. |
| 6,789,817 B2 * | 9/2004 | Uchiyama et al. ........ 280/730.2 |
| 6,860,507 B2 * | 3/2005 | Uchiyama et al. ........ 280/730.2 |
| 6,877,769 B2 * | 4/2005 | Kim et al. ................ 280/730.2 |
| 6,883,557 B1 * | 4/2005 | Eschbach et al. ........ 139/387 R |
| 6,945,556 B2 * | 9/2005 | Maertens .................... 280/729 |
| 6,962,364 B2 * | 11/2005 | Ju et al. ................... 280/730.2 |
| 2005/0011578 A1 * | 1/2005 | Walsh et al. ............ 139/383 R |
| 2005/0200108 A1 * | 9/2005 | Keshavaraj .............. 280/743.1 |
| 2006/0108776 A1 * | 5/2006 | Bradbum ................. 280/730.2 |
| 2006/0292949 A1 * | 12/2006 | Guillo et al. .................. 442/59 |

FOREIGN PATENT DOCUMENTS

WO     WO 03/051680 A1     6/2003

\* cited by examiner

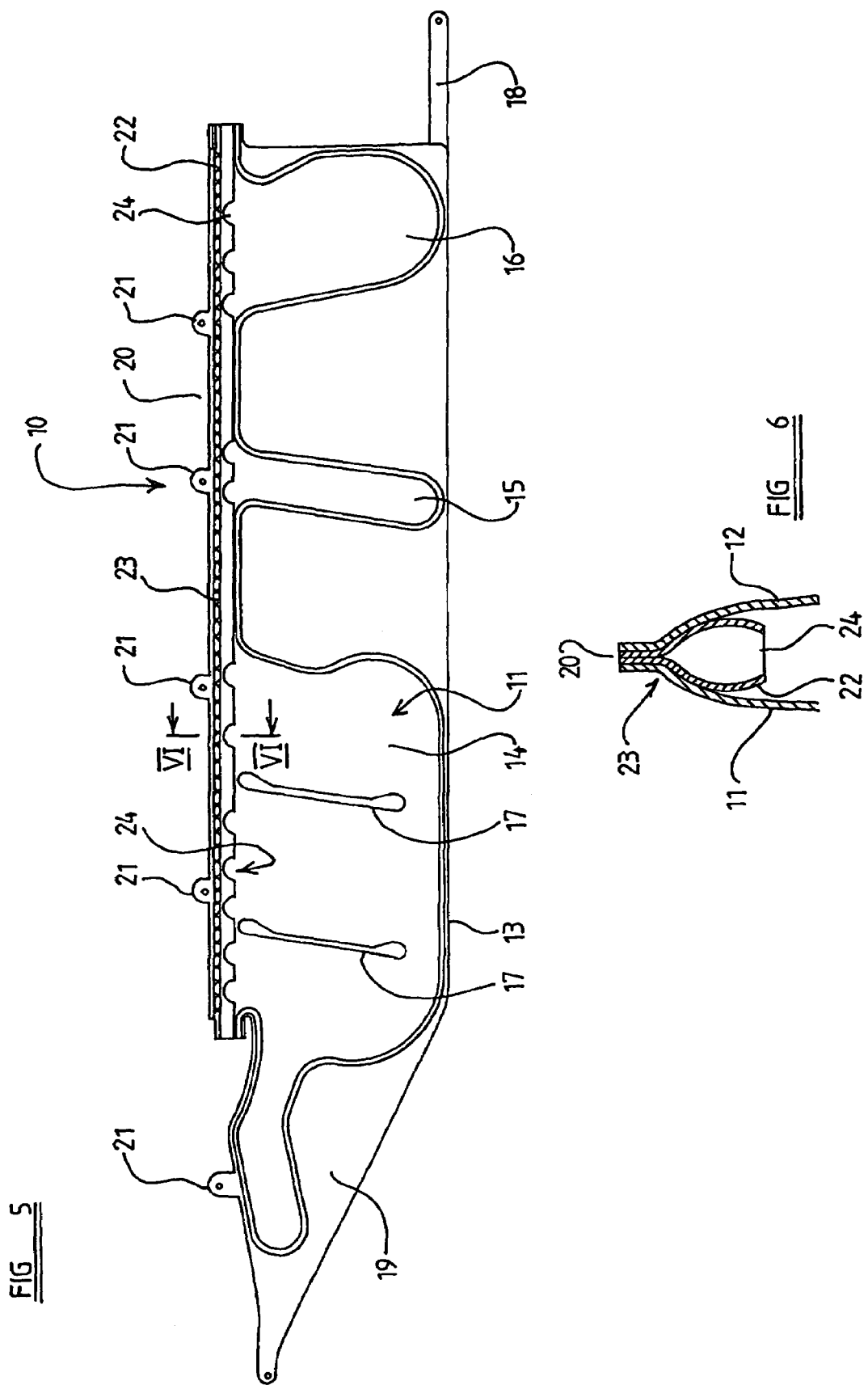

AIR-BAG

CROSS REFERENCE TO RELATED APPLICATION

This application claims priority to GB 0130225.6 filed Dec. 18, 2001 and PCT/SE02/02128 filed Nov. 22, 2002.

BACKGROUND OF THE INVENTION

The present invention relates to an air-bag, and more particularly relates to an air-bag of the type in which an inner gas supply tube is provided within the air-bag, the gas supply tube being adapted to be connected to a gas generator, and having apertures formed in the wall thereof to direct gas into discrete inflatable regions or chambers formed within the air-bag.

SUMMARY OF THE INVENTION

It has been proposed to provide an air-bag which has a plurality of inflatable regions or chambers which are to be supplied with gas from a gas generator. One example of such an air-bag is a so-called "inflatable curtain" which is adapted to be mounted in the roof of the vehicle, above the door openings of the vehicle, and is also adapted, when an accident occurs, to be deployed to lie adjacent the window openings formed in the door, thus forming a protective curtain located between the occupant of the vehicle and the side of the vehicle. Such inflatable curtains provide protection to the occupant of the vehicle in the event of a side impact or roll-over situation.

U.S. Pat. No. 6,199,898 B discloses a safety device of this type in which the inflatable curtain is formed of an inflatable element which is divided into a plurality of regions or chambers which are to be inflated. An internal fabric gas supply duct is provided. That gas supply duct is provided, along its length, with circular apertures formed in the wall of the duct through which gas can flow from the duct into those regions or chambers of the inflatable element which are to be inflated.

It is conventional for the main fabric parts of the air-bag, and also the internal fabric gas supply duct, to be cut-out from a large sheet or roll of fabric in such a way that maximum use is made of the fabric so that there is minimum wastage. This usually involves aligning the fabric that is to form the fabric gas supply duct so that either the warp yarns or the weft yarns of the fabric are parallel with the axis of the gas supply duct to be formed. The internal fabric gas supply duct is simply formed by taking an elongate strip of fabric and folding it so that the opposed edges are brought together, those opposed edges being inserted between the adjacent edges of the layers of fabric which form the main part of the inflatable curtain. The super-imposed edges are stitched together.

When gas is supplied to the supply duct, a very substantial pressure is generated within the supply duct which can effectively apply tension to the stitching.

FIG. 1, which is provided for diagrammatic purposes, illustrates an element of fabric 1 having perpendicular warp and weft yarns. A line of stitching 2 is provided which is in alignment with one of the sets of yarns. FIG. 1 illustrates the situation before tension is applied to the stitching 2, as indicated by the arrows 3. When tension is applied to the stitching 2 in this way, a "yarn pull" or "combing" effect may be observed, with the tension applied to the stitching 2 serving to compress some of the yarns together, leaving a space 4 in which only one set of yarns is present. In an environment where fabric is expected to remain gas-tight, this is clearly undesirable.

It is to be understood that effectively, tension may be applied to the stitching holding the above-described gas-flow duct in position, which may lead to the "yarn pull" or "combing" effect described above.

As gas is supplied to the gas supply duct, the pressure within the gas supply duct will rise swiftly, and the gas supply duct will inflate to become cylindrical. As there will be a very high pressure within the gas supply duct, a very high force will be applied to either the warp yarns or the weft yarns of the fabric. FIG. 3 illustrates an element of fabric 5, where a very substantial tension is being applied to the warp yarns 6 as indicated schematically by the arrows 7. If the tension is sufficiently great, the warp yarns 6 will simply break, and the fabric will tear, as shown in FIG. 4. This, again, is clearly undesirable.

The present invention seeks to provide an improved air-bag.

According to the present invention, there is provided an air-bag, the air-bag being formed from two super-imposed layers of fabric which define between them at least one inflatable region, there being a gas supply duct extending into the air-bag, the gas supply duct being provided with at least one aperture therein through which gas may flow into the said at least one inflatable region of the air-bag, the gas supply duct being of elongate form, and being formed of fabric having intersecting warp and weft yarns, the warp and weft yarns of said fabric being inclined at an angle of between 30° and 60° to the axis of the gas supply duct.

Preferably, the warp and weft yarns are inclined at an angle of between 40° and 50° to the axis of the gas supply duct.

Advantageously, the warp and weft yarns are inclined at an angle of 45° to the axis of the gas supply duct.

Preferably the spacing between the warp yarns is the same as the spacing between the weft yarns. Thus the yarns make a symmetrical pattern, and the number of warp yarns in a regular area (such as 1 cm$^2$) is equal to the number of weft yarns.

Conveniently, the gas supply duct is provided with circular apertures therein.

Alternatively, the gas supply duct is provided with irregular shaped apertures therein.

Advantageously, the gas supply duct is formed from a single elongate element of fabric which is folded so that the opposed edges thereof are super-imposed, with the super-imposed edges being secured together by stitching.

Conveniently, the air-bag takes the form of an inflatable curtain, the air-bag defining a plurality of inflatable regions, wherein the gas supply duct is arranged to extend along one side edge of the air-bag, the gas supply duct being provided with apertures to supply gas to each of said inflatable regions.

In order that the invention may be more readily understood, and so that further features thereof may be appreciated, the invention will now be described, by way of example, with reference to the accompanying drawings in which:

BRIEF DESCRIPTION OF THE DRAWINGS

FIG. 5 is a diagrammatic side view of an air-bag in accordance with the invention, FIG. 6 is a sectional view taken on the line VI-VI of FIG. 5.

DETAILED DESCRIPTION OF THE INVENTION

FIGS. 1 to 4 have been described above, and so will not be discussed again in detail.

Figure 1:
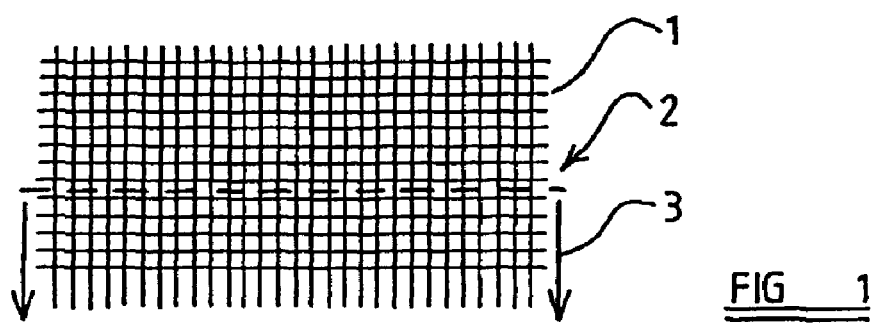
FIG. 1 is a diagrammatic view of an element of fabric with a line of stitching.
Figure 2:
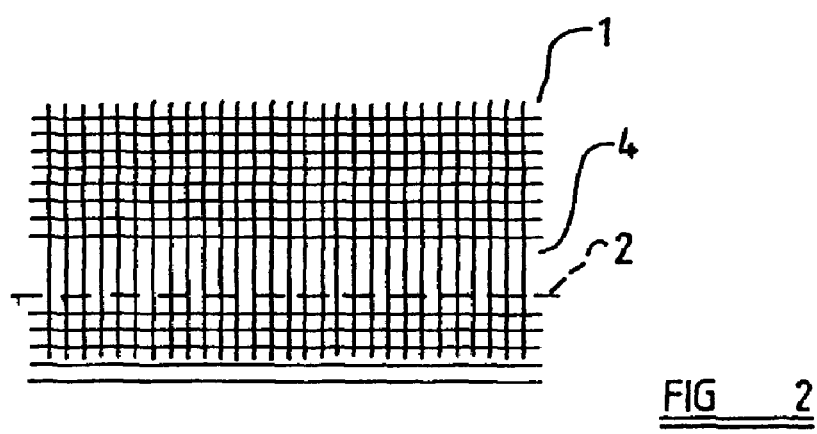
FIG. 2 is a diagrammatic view corresponding to FIG. 1 illustrating the fabric after tension has been applied to the line of stitching.
Figure 3:
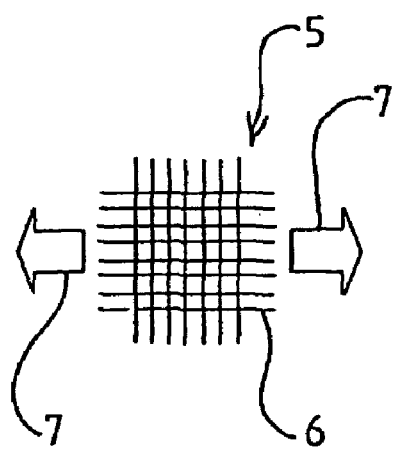
FIG. 3 is a diagrammatic view of an element of fabric under tension.
Figure 4:
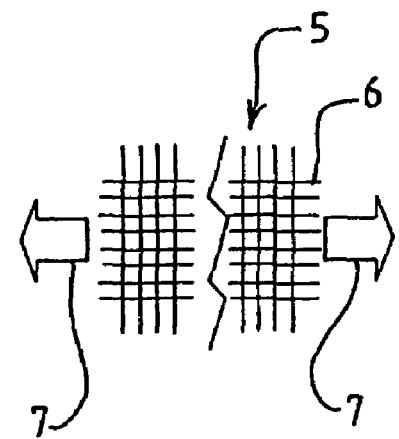
FIG. 4 is a diagrammatic view corresponding to FIG. 3 illustrating the fabric after it has torn.
Figure 7:
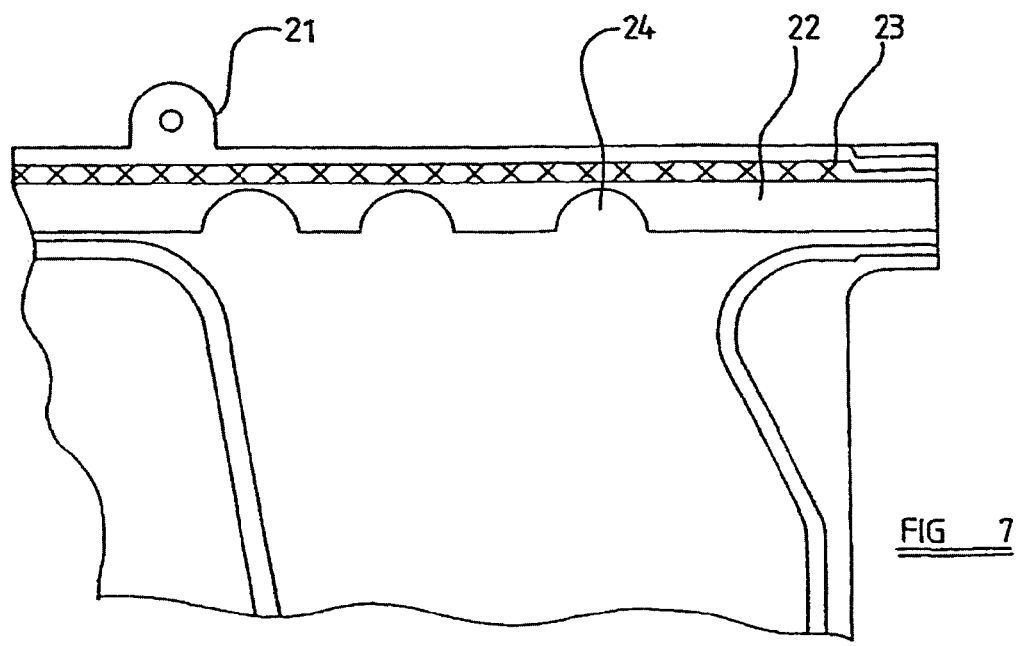
FIG. 7 is an enlarged view of part of FIG. 5.

Turning now to FIGS. 5 to 7, an air-bag in accordance with the present invention is illustrated in the form of a so-called inflatable curtain 10. The inflatable curtain 10 is formed from two super-imposed layers of fabric 11, 12, of similar outer shape. The layers of fabric 11,12 are interconnected by means of seams 13 which define inflatable regions 14, 15, 16. One of these inflatable regions 14 is sub-divided into inflatable chambers by means of seams 17 which interconnect the layers of fabric 11,12 in the region of said inflatable region 14.

At one end of the lower edge of the inflatable curtain 10, as shown in FIG. 5, a protruding strap 18 is provided, the strap 18 being adapted to be connected to an anchoring point in a vehicle. At the other end of the lower edge of the inflatable curtain 10, a generally triangular extension 19 is provided which is also adapted to be connected to an anchoring point within the vehicle. The upper edge 20 of the inflatable curtain 10 is provided with a plurality of apertured mounting lugs 21 by means of which the inflatable curtain 10 may be mounted in position within a motor vehicle.

Extending adjacent the upper edge 20 of the inflatable curtain 10, there is provided an internal gas supply duct 22 of the elongate form. The gas supply duct 22 is formed from a single element of fabric of elongate form, which is folded about its axis so that the opposed side edges thereof are substantially super-imposed. The side edges of the fabric of the gas supply duct are inserted between the super-imposed upper side edges of the fabric layers 11 and 12 of the inflatable curtain 10, and the four super-imposed edges are interconnected by stitching 23 (see FIG. 6). The lower-most part of the gas-supply duct 22 is provided with apertures 24 which are provided in those parts of the gas-supply duct which extend across the inflatable regions 14, 15, 16 of the inflatable curtain 10.

In use, the inflatable curtain gas 10 is supplied through the gas-supply duct 22 which becomes inflated, and gas passes through the apertures 24 formed in the gas supply duct 22 into the inflatable regions 14, 15, 16 to cause those regions of the inflatable curtain 10 to inflate. As thus far described, the inflatable curtain 10 has conventional features.

However, in the inflatable curtain 10 of the present invention, the gas-supply duct 22 is formed of a fabric where the warp and weft yarns are not co-aligned with the axis of the gas-supply duct. Instead, the warp and weft yarns of the fabric forming the gas supply duct 22 each make an angle relative to the axis of the duct. The angle may be in the region of 30°-60° or 40°-50°, but the preferable angle is 45°. Of course, in such a preferred arrangement, each of the warp yarns and the weft yarns will make an angle of 45° relative to the axis of the gas-supply duct 22. The yarns make a symmetrical pattern as the number of warp yarns in reach regular area (such as 1 cm$^2$) of the fabric is equal to the number of weft yarns. Thus, the spacing between the warp yarns is the same as the spacing between the weft yarns.

Figure 8:
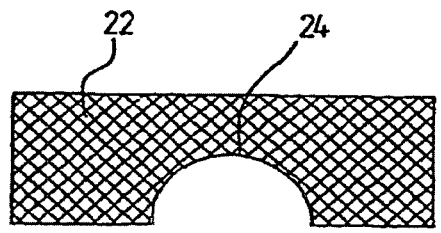
FIG. 8 is an enlarged view of part of FIG. 7 illustrating the air-bag before inflation.

FIG. 8 is an enlarged view of part of the gas-supply duct 22 in accordance with the invention showing an aperture 24 formed therein, and showing the intersecting warp yarns and weft yarns, each making an angle relative to the axis of the gas-supply duct 22.

Figure 9:
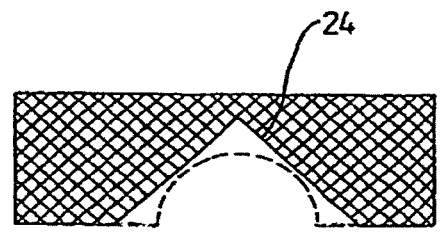
FIG. 9 is a view corresponding to FIG. 8 illustrating the air-bag after inflation.

On inflation of the inflatable curtain 10, the aperture 24 will tend to change shape, and the aperture 24 may achieve a substantially square shape, as shown in FIG. 9, on inflation of the inflatable curtain 10. It is found that the aperture 24, when in its square configuration, may have an area which is substantially greater than the area of the initial circular aperture 24. The increase in area may be in the region of 20% to 30% and may, in many cases, be 27%. The maximum area of the square aperture, as shown in FIG. 9 which is derived from the circular aperture shown in FIG. 8, may be limited only by the warp yarns and the weft yarns surrounding the circular aperture which are not in any way cut to form the aperture.

It is desirable to have a relatively large aperture leading from the gas supply duct 22 into the various inflatable regions 14, 15, 16 of the inflatable curtain 10 which are to be inflated in order to ensure the maximum flow of gas, and in order to ensure a rapid inflation of the inflatable curtain 10.

Figure 10:
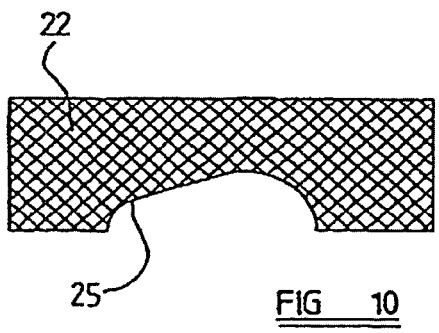
FIG. 10 is a view corresponding to FIG. 8 showing a modified embodiment of the invention prior to inflation of the air-bag.
Figure 11:
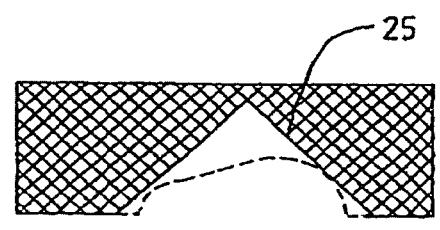
FIG. 11 is a view corresponding to FIG. 10 showing the air-bag of FIG. 10 after inflation.

FIG. 10 illustrates a further embodiment of the invention in which an aperture 25 is provided in the gas-supply duct, the aperture 25 being of irregular shape. It is to be appreciated that with an aperture 25 of this shape, again, the aperture may effectively deform upon inflation to have a size and configuration (illustrated in FIG. 11) which is bounded by the uncut warp and weft yarns which extend adjacent the aperture 25.

Any form of aperture may be provided in the gas-supply duct, and indeed a square or "diamond"-shaped aperture, having its sides co-aligned with the warp and weft yarns, may be provided if desired.

It is to be appreciated that in embodiments of the invention, the stitching 23 which secures the gas-flow duct to the fabric layers 11 and 12 of the inflatable curtain will extend at 45° to the warp yarns and weft yarns of the fabric forming the gas-flow duct 22.

Figure 12:
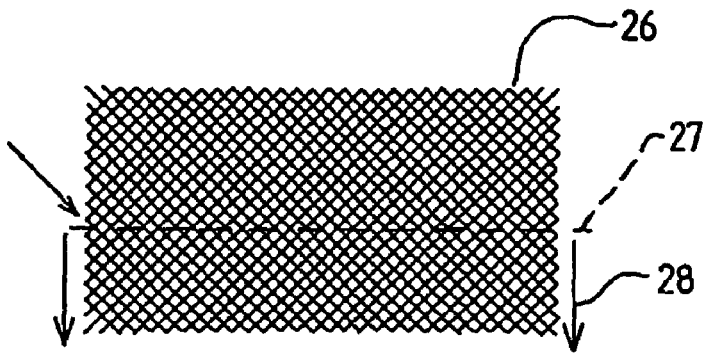
FIG. 12 is a diagrammatic view of an element of fabric provided with a line of stitching to which tension is to be applied.

Referring now to FIG. 12, a portion of fabric 26 is shown, provided with a row of stitching 27. The stitching 27 extends at 45° to each of the warp yarns, and each of the weft yarns of the fabric 26. The stitching 27 is being shown (by arrows 28) subjected to a downward force, and thus FIG. 12 effectively illustrates a situation corresponding to that illustrated in FIG. 1, as discussed above.

Figure 13:
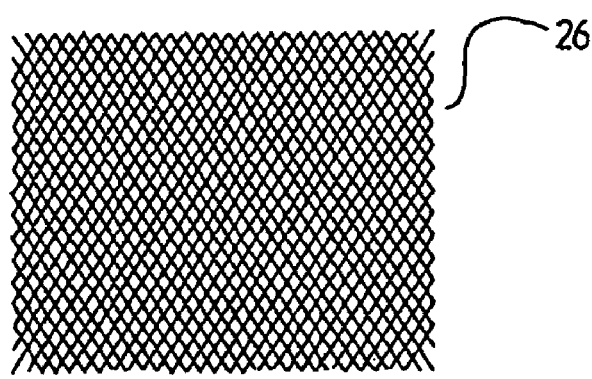
FIG. 13 is a view corresponding to FIG. 12 illustrating the fabric after tension has been applied.

When the downward force is applied to the stitching 27, as shown by the arrows 28, the stitching 27 cannot exhibit any substantial "yarn pull" or "combing" effect and thus, following the application of force to the stitching 27, the fabric 26 presents the condition shown in FIG. 13 with no visible deformation of the yarns of the fabric. It is thus to be appreciated that a gas supply duct in which the warp and weft yarns of the fabric forming the gas supply duct are not co-aligned with the stitching securing the gas supply duct in position, provides substantial benefits.

Figure 14:
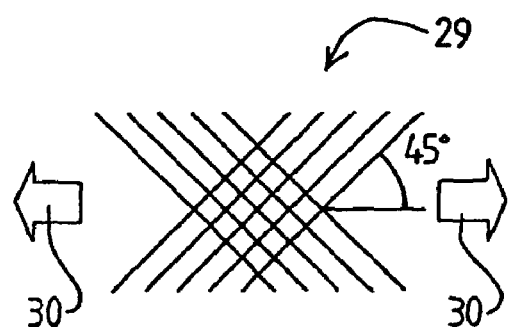
FIG. 14 is a diagrammatic view of fabric to which tension is to be applied.
Figure 15:
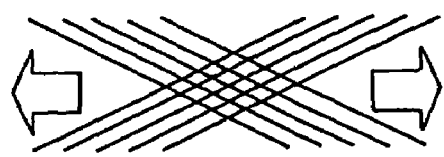
FIG. 15 is a diagrammatic view illustrating the fabric of FIG. 14 after tension has been applied.

Turning now to FIG. 14, an element of fabric 29 is illustrated in which the warp yarns and weft yarns intersect with the fabric being subjected to a force, as illustrated by the arrows 30, tending to apply tension to the fabric. The line of tension is not co-aligned with either the warp yarns or the weft yarns. The warp yarns and the weft yarns intersect the line of tension at approximately 45°.

As a consequence of the applied force, the angle of inclination between the warp yarns and the weft yarns changes, but the yarns do not break. The yarns effectively exhibit an effect which can be observed if a braided tube is inflated. The tube may initially have a configuration in which the yarns have a predetermined intersection angle. On inflation of the tube, the intersection angle of the yarns may change to permit an increase in diameter of the tube, whilst tending to decrease the length of the tube.

In any event it is to be observed that when a gas supply duct of an embodiment of the invention is inflated, and tension is applied to the fabric, there is only a minimal risk that the fabric will tear due to the fact that the warp and weft yarns being inclined to the axis of the gas supply duct.

While the above description constitutes the preferred embodiment of the present invention, it will be appreciated that the invention is susceptible to modification, variation and change without departing from the proper scope and fair meaning of the accompanying claims.

The invention claimed is:

1. An inflatable curtain air-bag comprising two super-imposed layers of air-bag fabric which define between them a plurality of inflatable regions, a gas supply duct extending into the air-bag and including a side extending along one edge of the air-bag, the gas supply duct being of elongate tubular form and defining a longitudinal axis and being formed of a single layer of duct fabric having intersecting warp and weft yarns, the gas supply duct being provided with a plurality of apertures formed through the duct fabric through which a gas may flow into the inflatable regions of the air-bag, the apertures forming a first configuration defining a first area surrounded by a plurality of cut warp and weft yarns, wherein upon inflation of the air-bag, the apertures deform to a second configuration defining a second area substantially larger than the first area, the warp and weft yarns of the duct fabric being inclined at an angle of between 30° and 60° to the longitudinal axis of the gas supply duct so that when the air-bag inflates the apertures deform to the second configuration, wherein the inclined warp and weft yarns reduce the likelihood of the fabric tearing during inflation of the air-bag, wherein the single layer of duct fabric is folded so that opposed edges of the duct fabric are super-imposed and positioned between the super-imposed layers of the air-bag fabric, the super-imposed edges of duct fabric being secured together by stitching extending in the direction of the longitudinal axis.

2. An inflatable curtain air-bag according to claim 1 wherein the warp and weft yarns are inclined at an angle of between 40° and 50° to the axis of the gas supply duct.

3. An inflatable curtain air-bag according to claim 2 wherein the warp and waft yarns are inclined at an angle of 45° to the axis of the gas supply duct.

4. An inflatable curtain air-bag according to claim 1 wherein the spacing between the warp yarns is the same as the spacing between the weft yarns.

5. An inflatable curtain air-bag according to claim 1 wherein the at least one aperture of the gas supply duct is circular.

6. An inflatable curtain air-bag according to claim 1 wherein the at least one aperture of the gas supply duct is irregular-shaped.

7. An inflatable curtain air-bag according to claim 1 wherein the stitching further secures together the super-imposed layers of duct fabric.

* * * * *